Sept. 26, 1939. D. H. BUCKLEY 2,173,932
SEPTIC TANK SLUDGE EJECTOR
Filed Feb. 19, 1937
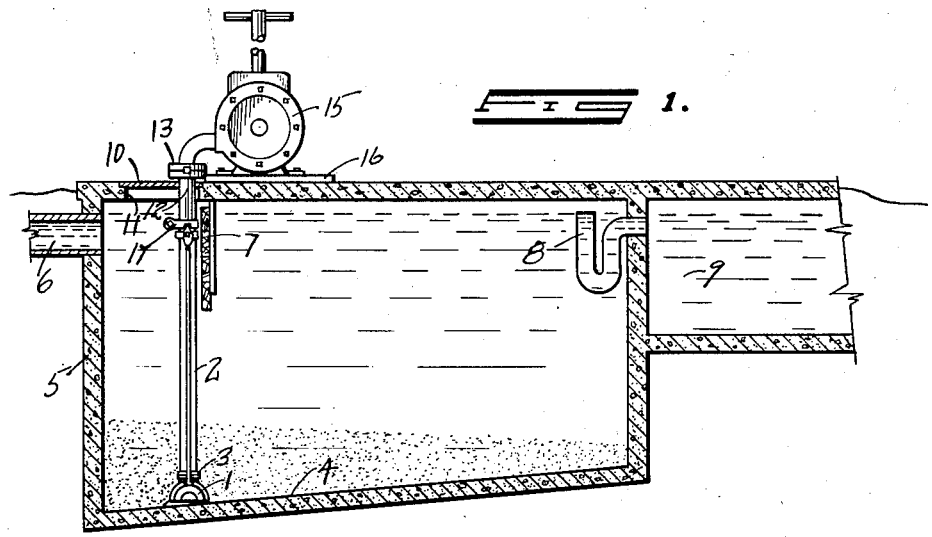
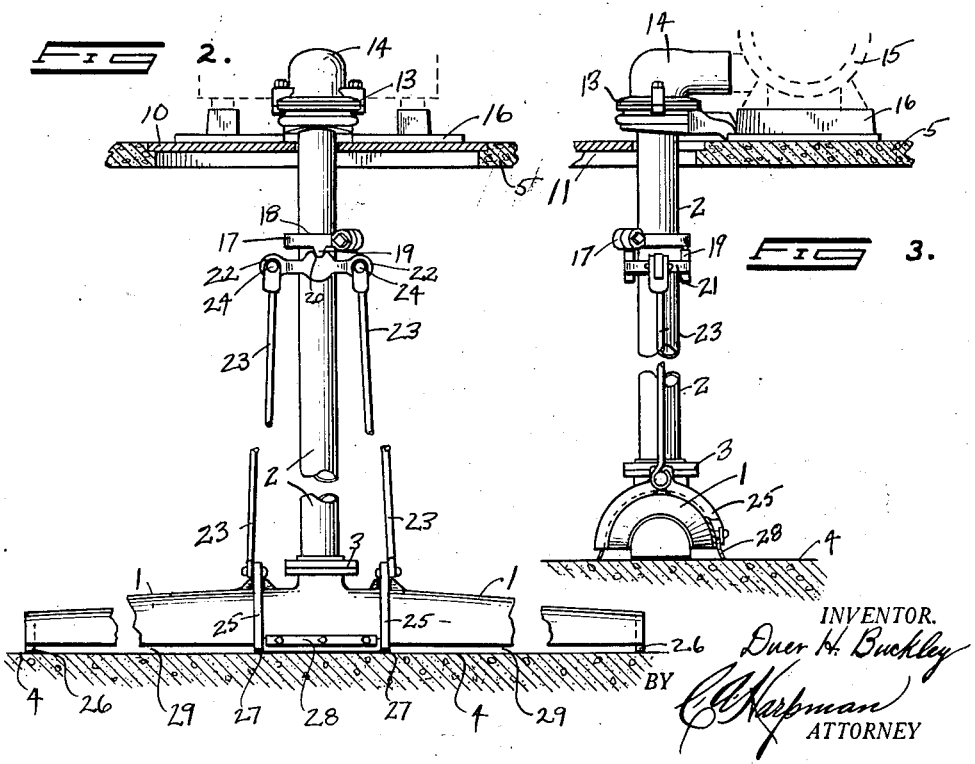
INVENTOR.
Duer H. Buckley
BY
ATTORNEY Patented Sept. 26, 1939

2,173,932

UNITED STATES PATENT OFFICE 2,173,932

SEPTIC TANK SLUDGE EJECTOR

Duer H. Buckley, Warren, Ohio, assignor to J. W. Swanson, Sharon, Pa.

Application February 19, 1937, Serial No. 126,635

2 Claims. (Cl. 210—3)

This invention relates to septic tanks.

The principal object of this invention is to provide an efficient and economical means of ejecting sludge from septic tanks.

A further object is to provide a device which pumps out the sludge settled in the bottom of a septic tank, without the necessity of pumping out the fluid within the tank above the sludge.

A further object is to provide a device of this kind which may be readily installed in various types of septic tanks.

A further object is to provide a sludge suction member functioning at the bottom of a septic tank.

A still further object is to provide means for adjusting and holding said sludge suction member so as to hold the same on the bottom of the septic tank and to provide for adjustment where the bottom of the tank is not level.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a cross section of an ordinary septic tank showing the septic tank sludge ejector installed.

Figure 2 is an enlarged detail view of Figure 1, partly in cross section, showing the parts of the sludge ejector at a quarter angle from that shown in Figure 1.

Figure 3 is an enlarged detail view of Figure 1, partly in cross section.

In ordinary septic tanks we find that a sludge settles in the bottom of the tank and from time to time has to be removed. This process is an expensive one as the entire fluid and sludge of the tank has to be taken out. The theory of the septic tank is that the culture within the tank causes the material entering the tank to become more or less of a liquid and that the outlet of the septic tank, which is usually near the upper portion of the tank, will, for a considerable length of time, take care of the passage of the contents of the septic tank. My invention provides a device that will take care of the sludge by removing the same without the necessity of emptying the entire septic tank.

By referring to Figures 1, 2, and 3 it will be seen that there is provided a device installed partly within and partly without a septic tank, this device comprising a sludge suction member 1 to which is attached, at a central point, a vertical tube 2 by means of a coupling 3. This coupling 3 is preferably provided with a soft metal gasket in order to insure the sealing of the coupling. This sludge suction member 1, when installed, rests on a bottom 4 of a septic tank 5. By referring to Figure 1 it will be seen that the bottom 4 of the septic tank 5 is inclined and that the sludge suction member 1 is positioned near the lower end of the incline. In the ordinary construction of a septic tank it is usual that there is an intake 6 near the top of the septic tank 5 and a baffle 7 spaced apart from the intake in order that the non-liquid portions entering the tank will be directed downwardly into the tank. It will also be seen that there is provided a U-shaped outlet tube 8 leading into a chamber 9, which in turn may be connected to any suitable filter means known to the art. The septic tank 5 is provided with a closure plate 10 for the purpose of closing an opening 11 in the top of the septic tank 5. It will be seen that an upper end 12 of the vertical tube 2 extends through this closure plate 10 and is provided with a coupling 13 which joins the vertical tube 2 to a tube 14 leading to a pump 15 which is mounted upon a suitable base 16 resting upon the top of the septic tank 5. In order to provide desirable suction for operating the device a double action pump should be used.

In order to secure desirable support for the device there is provided a collar 17 clamped to the vertical tube 2 at a point 18. This collar 17 is provided with a pair of oppositely disposed pivot lugs 19 which function with notches 20 oppositely disposed and formed in a loosely fitting collar 21. This collar 21 is provided with a pair of oppositely disposed pivot arms 22. A pair of oppositely disposed brace and support arms 23 are pivoted in the oppositely disposed pivot arms 22 by means of pivots 24. The lower ends of the brace and support arms 23 are hinged to saddle members 25 which rest freely upon the outer surface of the sludge suction member 1.

In the installation of the device it may be found that the bottom of the tank may not be level, that is, on a line from one end to the other underneath the sludge suction member, and in order that the legs 26 formed at the outer ends of the sludge suction member 1 may rest upon the bottom of the tank, necessary adjustment automatically takes place by means of the pivot lugs 19, pivoting in notches 20, thus providing for an upward or downward movement of the oppositely disposed pivot arms and connecting parts. By referring to Figure 2 it will be seen that the lower ends 27 of the saddle members 25 also rest upon the bottom 4, thus providing a suitable support for the weight upon the top of the septic tank 5. It will also be seen that there is provided a pair of non-corrodible metal aprons 28 centrally positioned upon the lower edges of the sludge suction member 1 for the purpose of preventing the sludge from being carried directly into the hollow interior of the sludge suction member 1 at a central point, but making it necessary that it be drawn underneath the oppositely disposed ends of the sludge suction member 1 through narrow openings 29 formed between the bottom 4 and the lower edges of the sludge suction member 1.

It is understood and has been demonstrated by actual test that it is not necessary to provide joint means in the vertical tube 2 to provide for the automatic adjustment as it is obvious that an ordinary vertical pipe will bend sufficiently to allow for this automatic adjustment. It is further understood that in the installation of the device the collar 17 must be forced down securely so that the pivot lugs 19 are under pressure when functioning in the notches 20.

What I claim is:

1. In combination with a septic tank having the usual inlet and outlet openings, a sludge ejector comprising a wide area suction member positioned on the floor of the said septic tank, said wide area suction member provided with a plurality of slot-like openings on its lower surface, a vertical suction tube positioned on said wide area suction member, aprons positioned on either side of the said wide area suction member at points adjacent to the junction of the said vertical suction tube, adjusting means on said vertical suction tube for adjusting the said suction member to the floor of the said septic tank when it is uneven or tilted and to support the said suction tube, together with a slow action pump positioned on one end of the said vertical suction tube so as to pump the sludge through the said suction member and vertical suction tube.

2. In combination with a septic tank having the usual inlet and outlet openings, a sludge ejector comprising a wide area suction member positioned on the floor of the said septic tank, said wide area suction member provided with a slot-like opening on its lower surface, a vertical suction tube positioned on said wide area suction member, aprons positioned on either side of the said wide area suction member at points adjacent to the junction of the said vertical suction tube, adjusting means on said vertical suction tube for adjusting the said suction member to the floor of the said septic tank when it is uneven or tilted and to assist in supporting the said vertical suction tube, said adjusting means comprising a collar clamped to said tube and a secondary loosely fitting collar on said tube, a pair of oppositely disposed brace and support arms pivoted to said loosely fitting collar and a pair of saddle members connected to the brace and support arms and resting freely on said wide area suction member, a slow action pump positioned on one end of the said vertical suction tube so as to pump the sludge through the said suction member and vertical suction tube.

DUER H. BUCKLEY.